(12) United States Patent
Kuge

(10) Patent No.: US 8,225,051 B2
(45) Date of Patent: Jul. 17, 2012

(54) ACCESS CONTROL METHOD FOR A MEMORY, MEMORY CONTROLLER FOR CONTROLLING ACCESS TO THE MEMORY, AND DATA PROCESSING APPARATUS

(75) Inventor: Yuuji Kuge, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 666 days.

(21) Appl. No.: 11/902,111

(22) Filed: Sep. 19, 2007

(65) Prior Publication Data
US 2008/0077730 A1 Mar. 27, 2008

(30) Foreign Application Priority Data
Sep. 27, 2006 (JP) .................................. 2006-263181

(51) Int. Cl.
*G06F 12/00* (2006.01)
(52) U.S. Cl. ........ 711/156; 711/103; 711/167; 711/168; 711/170; 711/173
(58) Field of Classification Search .................. None
See application file for complete search history.

(56) References Cited

U.S. PATENT DOCUMENTS

| 6,606,628 B1 * | 8/2003 | Monsen et al. ................... 1/1 |
| 2004/0210733 A1 * | 10/2004 | Sohn et al. .................... 711/168 |
| 2005/0015408 A1 * | 1/2005 | Shona ........................... 707/200 |

FOREIGN PATENT DOCUMENTS

| JP | 10-50087 | 2/1998 |
| JP | 2005-38518 | 2/2005 |

* cited by examiner

*Primary Examiner* — Kevin Ellis
*Assistant Examiner* — Alan Otto
(74) *Attorney, Agent, or Firm* — Young & Thompson

(57) ABSTRACT

In an access control method for a memory including a first memory block and a second memory block, first flag is read from the first memory block, and second flag is read from the second memory block. A comparison between the first flag and the second flag is done, and then, the comparison result is outputted as a first calculation value. One of the first memory block and the second memory block is selected in response to the first calculation value to decide a valid memory block. In the access control method for the memory executed in the above-mentioned manner, even when the first flag and the second flag employed in order to determine the valid memory block are brought into any statuses, the valid memory block does not become indefinite, and a single memory block can be determined as the valid memory block.

6 Claims, 10 Drawing Sheets

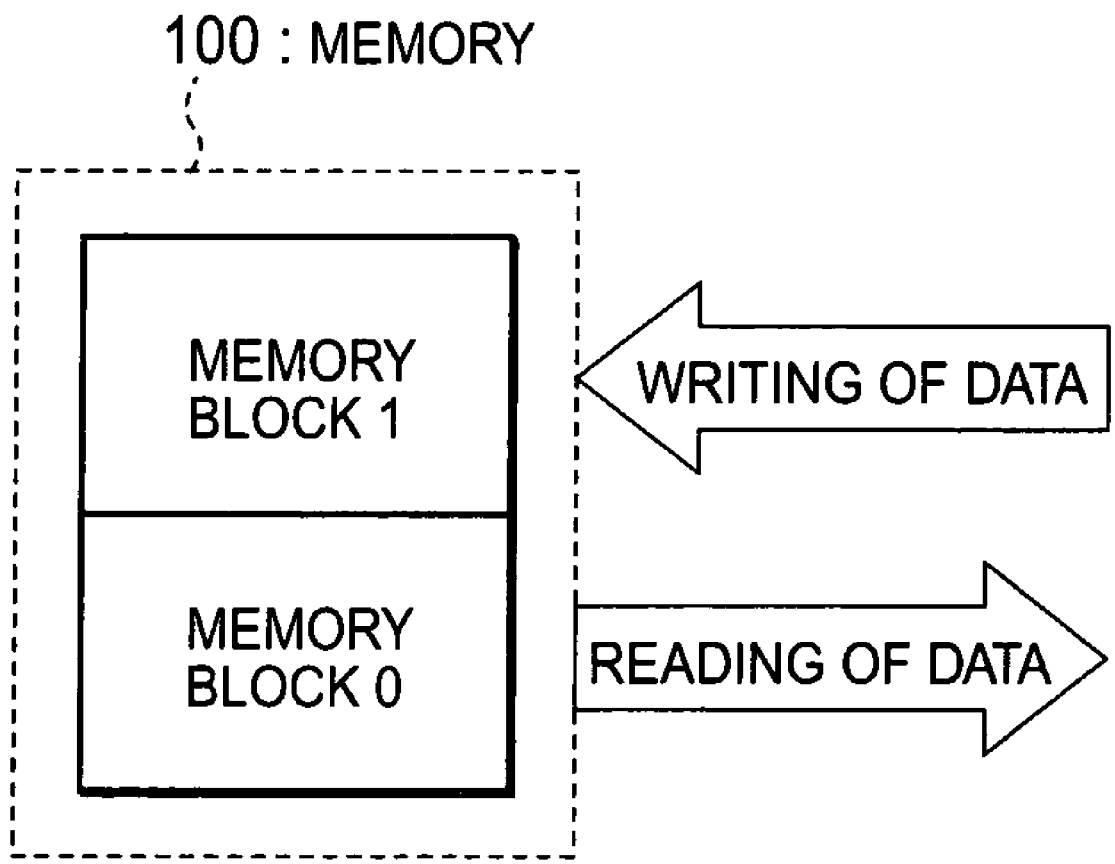

FIG. 3 PRIOR ART
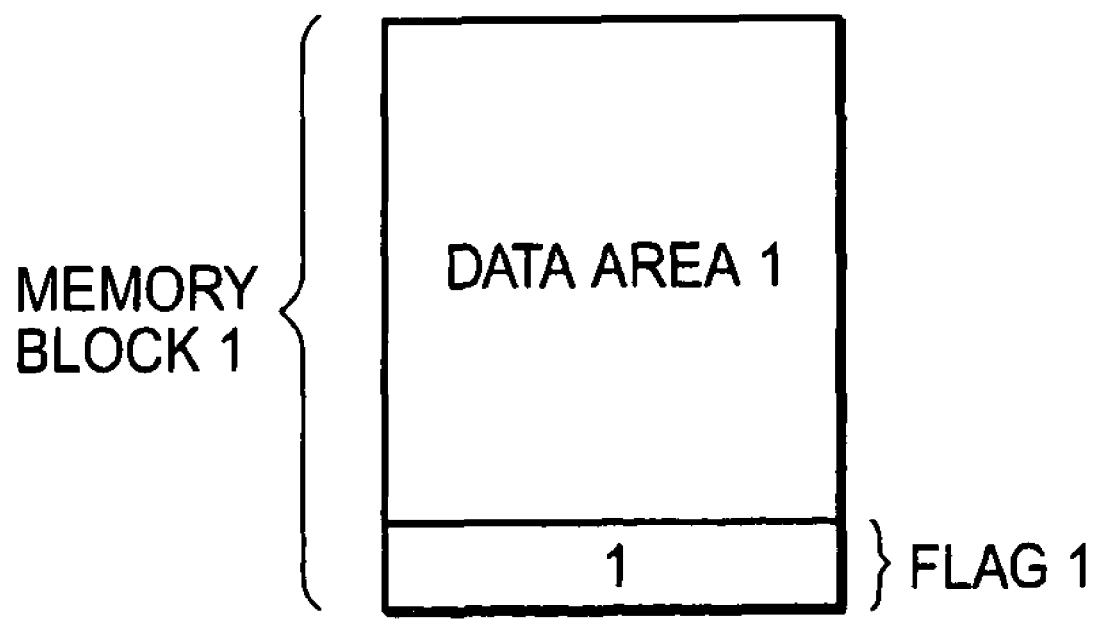
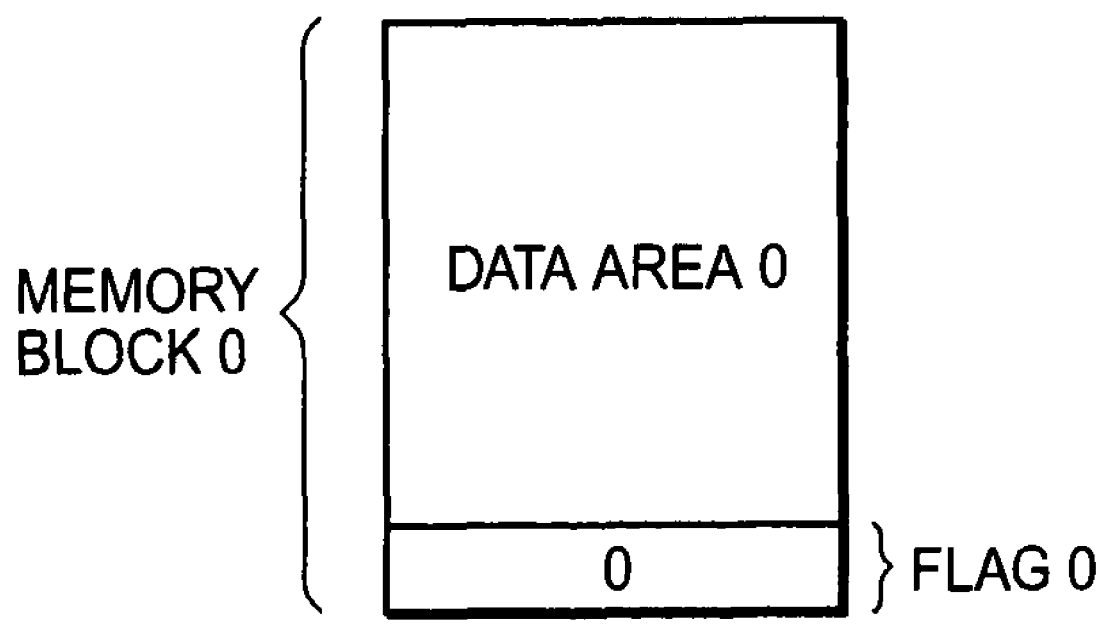

| FLAG 0 | FLAG 1 | AREA NUMBER OF VALID EXPANSION AREA |
|---|---|---|
| 0 | 0 | 0 |
| 0 | 1 | 1 |
| 1 | 1 | 0 |
| 1 | 0 | 1 |

ACCESS CONTROL METHOD FOR A MEMORY, MEMORY CONTROLLER FOR CONTROLLING ACCESS TO THE MEMORY, AND DATA PROCESSING APPARATUS

BACKGROUND OF THE INVENTION

1. Field of the Invention

The present invention relates to an access control method for a memory, a memory controller for controlling access to the memory, and a data processing apparatus. More specifically, the present invention relates to a technology capable of selecting a valid storage area in an optimum manner within a memory where a plurality of storage areas are provided.

2. Description of the Related Art

In some cases, it is desirable that data writing and data reading to/from a memory can be simultaneously executed. One of those typical examples is a flash memory into which computer programs executed by central processing unit (CPU) have been written. When a flash memory is used in which data writing and data reading cannot be executed at the same time, an instruction code cannot be read from the flash memory during the data writing operation, so processing by a CPU is interrupted. In the above a flash memory, it is desirable that an instruction code of a program can be read even while the data writing operation is carried out.

One measure for simultaneously performing data writing and data reading is to constitute a memory by a plurality of memory blocks which can be independently accessed. FIG. 1 is a block diagram for showing a structure of a conventional memory 100 arranged in the above-mentioned manner. The memory 100 is equipped with two memory blocks, namely, a memory block 0 and a memory block 1. While data is read from the memory block 0, data can be written in the memory block 1.

When the above measure is applied to a flash memory, a problem arises. That is, in a flash memory, a write parameter and security setting data are required to be stored in a memory array. A write parameter is data which is used in data writing. For instance, data indicative of a structure of a sector is contained in the write parameter. Security setting data is data which is employed to set security of a flash memory. The security setting data indicates whether writing and erasing of an entire storage area of the flash memory and/or each of memory blocks thereof are permitted or prohibited. Based upon the security setting data, writing/erasing of the entire storage area of the flash memory can be prohibited, and writing/erasing of the respective memory blocks thereof can be prohibited. In order to change setting of security, security setting data needs to be updated.

The problem occurs in a case where security setting data is updated. It is desirable that updating of security setting data be carried out in association with a writing operation. However, in a structure that a write parameter and security setting data are stored in a specific single memory block, while a writing operation for another memory block is carried out, the write parameter and the security setting data cannot be updated.

FIG. 2A is an explanatory diagram for describing the above-mentioned problem. A semiconductor device 200 of FIG. 2A is equipped with a flash memory 201 and a memory controller 202. The flash memory 201 is provided with two memory blocks, namely, a memory block 0 and a memory block 1, and each of the memory blocks is equipped with a user data area and an expansion area. A write parameter and security setting data are stored in an expansion area 0 of the memory block 0. An expansion area 1 of the memory block 1 is an unused area. In the case where a reading operation from the memory block 0 and a writing operation in the memory block 1 are carried out at the same time, first, the memory block 1 is set to a write mode and the memory block 0 is set to a read mode. Subsequently, a write parameter is read from the expansion area 0, and the memory controller 202 writes data in the memory block 1 by using the read write parameter. In the above-mentioned operations, rewriting of the security setting data cannot be continuously carried out after the data writing to the memory block 1. In order to rewrite the security setting data, the memory block 0 is required to be changed from the read mode to the write mode. However, rewriting of the security setting data in the above-mentioned manner is not preferable, because the process of the writing operations becomes cumbersome.

As one of measures capable of solving the above-mentioned problem, a write parameter and security setting data are stored in each of memory blocks of a flash memory. FIG. 2B is a block diagram for indicating a structure of the above-mentioned flash memory. In a semiconductor device 200 of FIG. 2B, an expansion area 0 and an expansion area 1 are prepared for a memory block 0 and an memory block 1, respectively, and write parameters and security setting data are stored in each of the expansion areas 0 and 1.

In the semiconductor device 200 of FIG. 2B, for example, a reading operation from the memory block 0 and a writing operation in the memory block 1 are carried out in the following manner. First, after the write parameter and the security setting data have been read, the memory block 0 is set to a read mode, whereas the memory block 1 is set to a write mode. Data is written in the memory block 1 by employing the read write parameter. Subsequently, the security setting data of the expansion area 1 of the memory block 1 is updated. The memory block 1 is maintained under a condition that the memory block 1 has been set to the write mode until updating of the security setting data of the expansion area 1 is finished. The security setting data of the expansion area 0 is not updated.

In the above-mentioned operations, because updating of the security setting data is performed only in any one of those two expansion areas 0 and 1, it is necessary to judge in which of the expansion areas 0 and 1 the valid security setting data (i.e., latest data) is stored. As the most typical method of identifying in which of a plurality of areas the valid data is stored, flags are employed, as disclosed in, for example, JP 10-50087 A. For instance, as shown in FIG. 3, a flag 0 and a flag 1 are prepared for a data area 0 and a data area 1, respectively, in order to indicate in which of those data areas 0 and 1 the valid data is stored. When the data stored in the data area 0 is valid, the flag 0 is set to "1", and the flag 1 is reset to "0". On the other hand, when the data stored in the data area 1 is valid, the flag 1 is reset to "1", and the flag 0 is reset to "0".

Further, JP 2005-38518 A discloses that a 2-bit memory selector is prepared for each of management areas of the two memories in order to indicate which of those two memories is valid. In the technology disclosed in the above-mentioned JP 2005-38518 A, a memory from which data should be read is judged from both the data of the memory selectors of the two memories. In this conventional technique, rewriting of the memory selectors is carried out by setting one memory of the two memories to a program mode and another memory to an erase mode.

The present inventor has recognized that the technology for indicating the valid area by setting the flag to 1, as disclosed in JP 10-50087 A, has the following problem. That is, if both the flags 0 and 1 become "1" due to a certain failure, then the valid data area becomes indefinite. The condition in which the valid data area becomes indefinite is not preferable from a viewpoint of securing operational stabilities of the semiconductor device.

In addition, the technology for indicating the valid area by setting the flag to 1, as disclosed in JP 10-50087A, has another problem. That is, in order to change the valid areas, the flags for all of the areas must be rewritten. For instance, in order to change such a status that a flag 0 of a memory 0 has been set to "1" into another status that a flag 1 of a memory 1 has been set to "1", the flag 1 of the memory 1 must be set to "1" and also the flag 0 of the memory 0 must be reset to "0". However, such a sequential operation is not suitable in the case where a writing operation is performed with respect to one of the memories 0 and 1, and a reading operation is performed with respect to another memory.

For instance, the following case can be considered: the writing operation for the memory 1 and the reading operation for the memory 0 are carried out at the same time. In this case, in order that the flag 0 of the memory 0 is reset to "0", the operation mode of this memory 0 must be changed from the read mode to the write mode. The flag rewriting operation in the above-mentioned manner is not preferable, because the operation sequence become cumbersome.

Also, the present inventor considers that the technology disclosed in JP 2005-38518 A cannot solve the above-mentioned problems.

SUMMARY

The present invention seeks to solve one or more of the above problems, or to improve upon those problems at least in part.

In one embodiment, an access control method for a memory including a first memory block and a second memory block includes reading first flag from the first memory block, and reading second flag from the second memory block. The method further includes selecting one of the first memory block and the second memory block in response to a result of comparing the first flag and the second flag to decide a valid memory block.

In the access control method for the memory executed in the above-mentioned manner, the valid memory block is determined based upon the comparison result. As a result, even when the first and second flag employed in order to determine the valid memory block are brought into any statuses, the valid memory block does not become indefinite, and a single memory block can be determined as the valid memory block.

The access control method for the memory including the first memory block and the second memory block preferably includes specifying a memory block that is not selected as the valid memory block to decide a writing target memory block, inverting a flag of the writing target memory block to produce an inverted value, and writing the inverted flag back into the writing target memory block.

Further, the access control method for the memory including the first memory block and the second memory block preferably includes Specifying the valid memory block as a writing target memory block, and holding a flag of the writing target memory block.

With the above arrangement, when one of the first memory block and the second memory block is rewritten, only the flag of the memory block to be rewritten is inverted, so that the rewritten memory block can be set to the valid memory block. As a consequence, there is no necessity that the flag updating (rewriting) operation is carried out with respect to the memory block other than the memory blocks to be updated (to be rewritten), and the rewriting operation can be effectively simplified.

In another embodiment, a data processing apparatus includes a memory including a first memory block that stores first flag and a second memory block that stores second flag, a memory controller which can access the memory; and a central processing unit (CPU) receiving data read from the memory. The data processing apparatus reads the first flag and the second flag from the first memory block and the second memory block, and selects one of the first memory block and the second memory block in response to a result of comparing the first flag and the second flag to decide a valid memory block.

In the data processing apparatus constructed in the above-mentioned manner, the valid memory block is determined based upon the comparison result. As a result, even when the flags are brought into any statuses, the valid memory block does not become indefinite, and the single memory block can be determined as the valid memory block.

In further another embodiment, a memory controller is capable of accessing a memory including a first memory block that stores first flag and a second memory block that stores second flag. The memory controller reads the first flag and the second flag from the first memory block and the second memory block, and selects one of the first memory block and the second memory block in response to a result of comparing the first flag and the second flag to decide a valid memory block.

In the memory controller arranged in the above-mentioned manner, the valid memory block is determined based upon the comparison result. As a result, even when the flags are brought into any statuses, any one of the first memory block and the second memory block can be determined as the valid memory block.

BRIEF DESCRIPTION OF THE DRAWINGS

The above and other objects, advantages and features of the present invention will be more apparent from the following description of a certain preferred embodiment taken in conjunction with the accompanying drawings, in which:

FIG. 1 is a diagram for indicating the structure of a conventional memory.

FIG. 3 is a diagram for representing the structure of the conventional memory having a plurality of data areas.

DETAILED DESCRIPTION OF THE PREFERRED EMBODIMENT

The invention will be now described herein with reference to illustrative embodiment. Those skilled in the art will recognize that many alternative embodiments can be accomplished using the teachings of present invention and that the invention is not limited to the embodiment illustrated for explanatory purposes. A description is made of embodiments with reference to a semiconductor device (data processing apparatus) on which a CPU, a memory controller, and a flash memory are mounted as one example.

First Embodiment

Figure 2A:
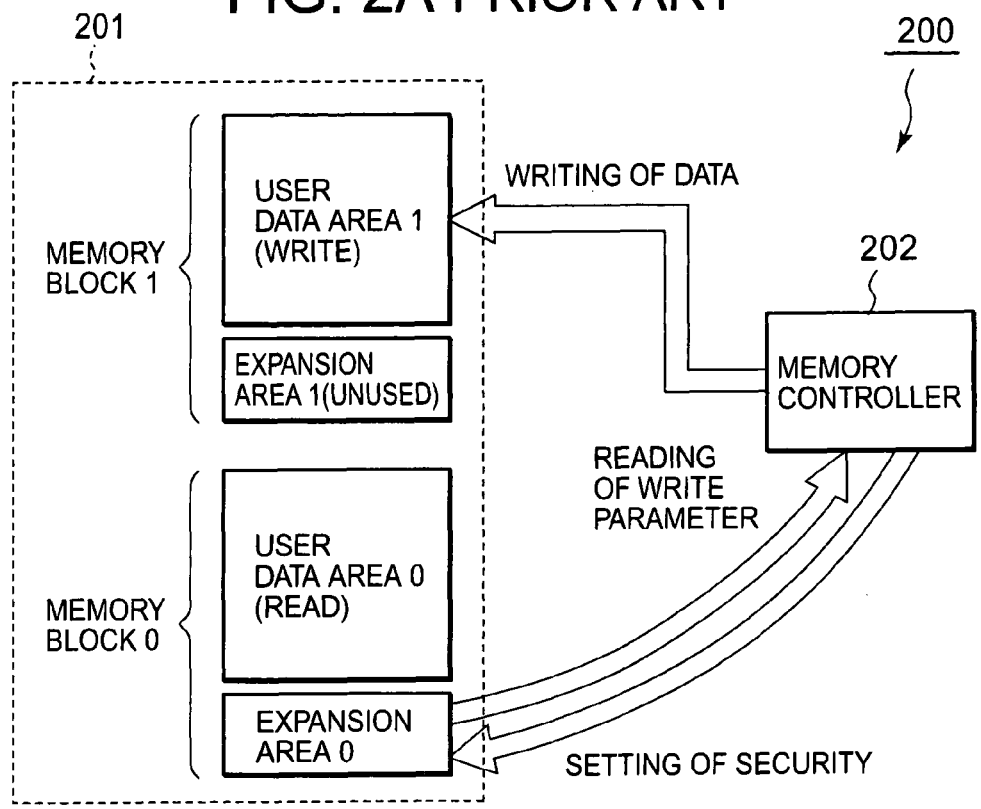
FIG. 2A is a diagram for showing an example of the structure of a flash memory in which a write parameter and security setting data have been stored in an expansion area of one memory block.
Figure 2B:
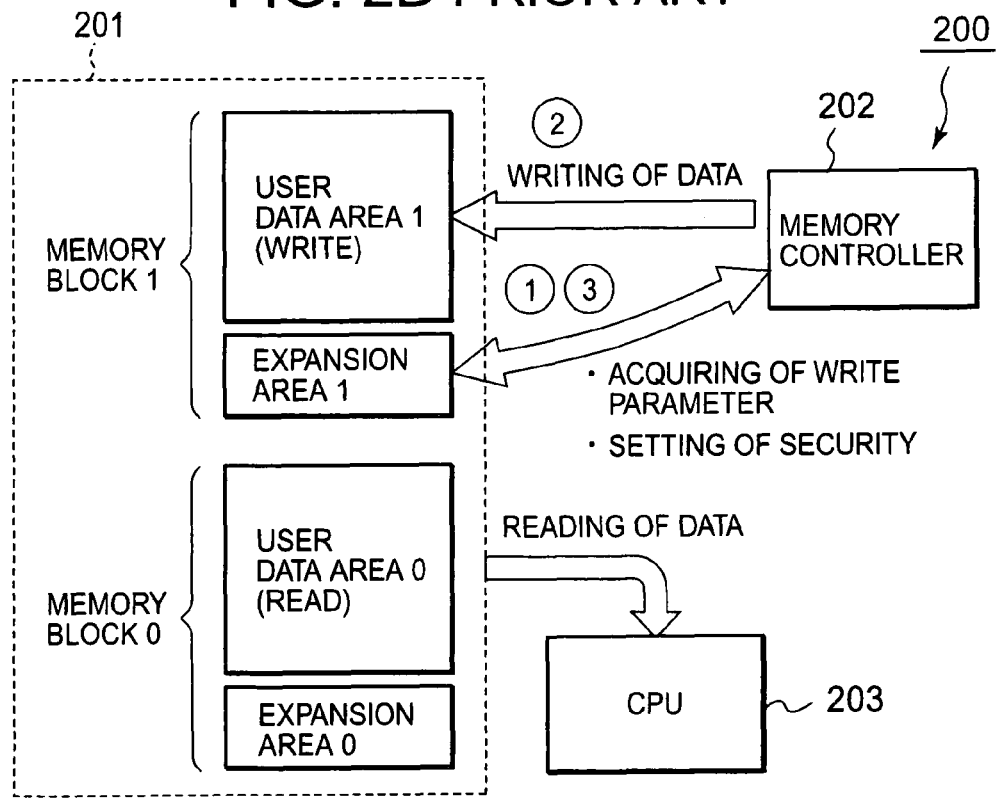
FIG. 2B is a diagram for indicating an example of the structure of the flash memory in which the write parameters and the security setting data have been stored in respective expansion areas of a plurality of memory blocks.
Figure 4:
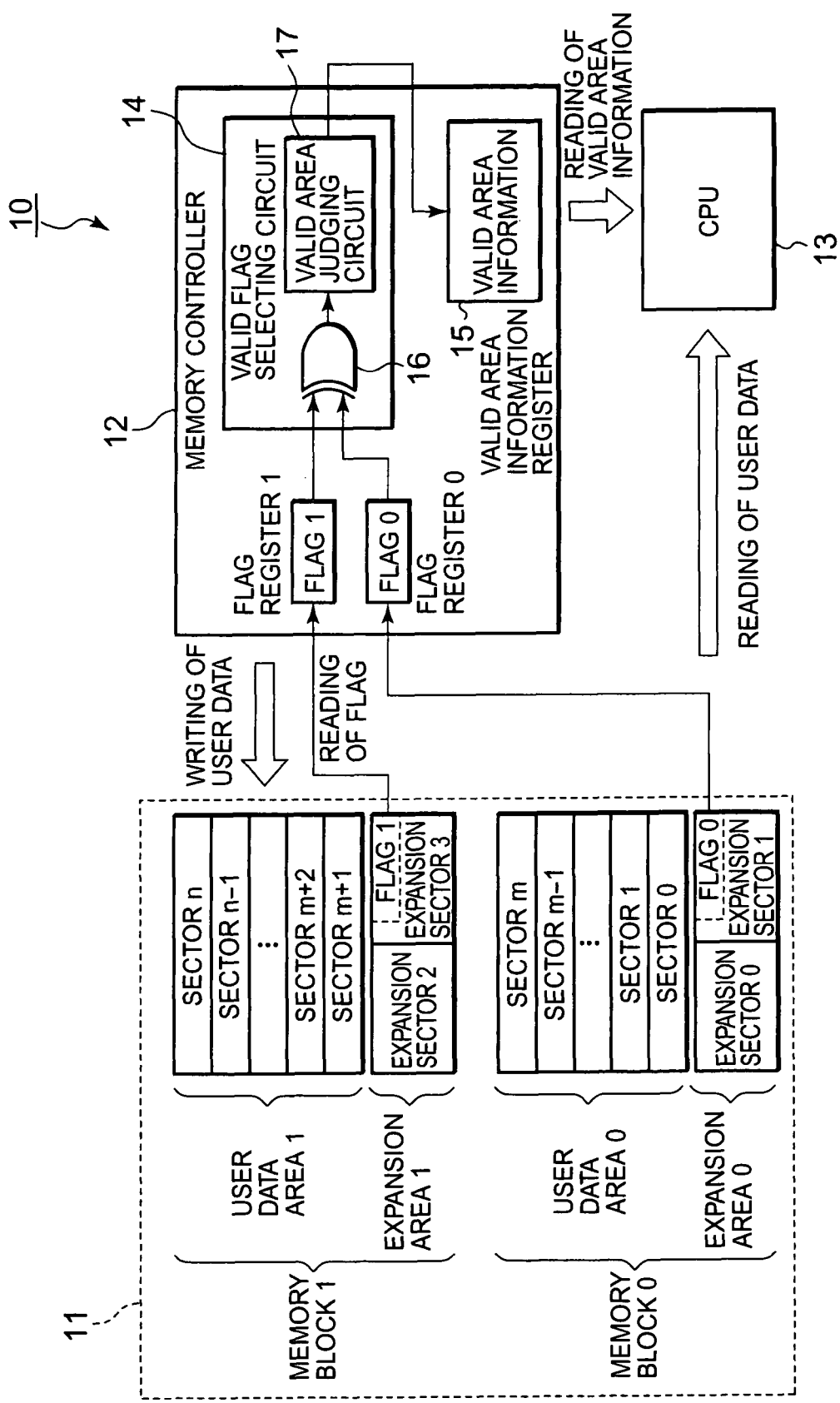
FIG. 4 is a block diagram for indicating a structure of a semiconductor device according to the first embodiment of the present invention.

FIG. 4 is a block diagram for indicating a structure of a semiconductor device 10 according to the first embodiment of the present invention. The semiconductor device 10 is equipped with a flash memory 11, a memory controller 12, and a CPU 13. The memory controller 12 has a function for controlling the flash memory 11, and more specifically, has a function capable of controlling a writing operation with respect to the flash memory 11. The CPU 13 is configured in such a manner that the CPU 13 can access the flash memory 11 and read data from the flash memory 11.

The flash memory 11 is constructed of two memory blocks 0 and 1. In each of the memory blocks 0 and 1, flash memory cells are arranged in a matrix shape. In the flash memory cells, electric charges are stored in floating gates so as to store therein data. It should be understood that in this example, a technical term "floating gate" is not limited only to a conductive material such as polysilicon, but may imply an insulator capable of holding electric changes, which is employed in a metal oxide nitride oxide silicon (MONOS) technique.

The memory block 0 is constructed of a user data area 0 and an expansion area 0. Similarly, the memory block 1 is constructed of a user data area 1 and an expansion area 1. The user data areas 0 and 1 correspond to areas which are used to store therein user data. On the other hand, the expansion areas 0 and 1 correspond to areas which are employed to store therein write parameters and security setting data. As described above, a write parameter corresponds to data which is used to write data, whereas security setting data corresponds to data which is used to set security of a flash memory. The security setting data indicates whether writing and erasing operations as to an entire storage area of the flash memory and/or each of memory blocks thereof are permitted, or prohibited. In order to change setting of the security, the security setting data must be updated. An area number 0 and another area number 1 are allocated to the expansion areas 0 and 1, respectively.

A 1-bit flag 0 and another 1-bit flag 1 are stored in the expansion areas 0 and 1, respectively. The flags 0 and 1 indicate in which of the expansion areas 0 and 1 valid (namely, latest) security setting data is stored. As will be discussed later, when both a write parameter and security setting data are read, the memory controller 12 refers to the flags 0 and 1 so as to judge the expansion area in which valid security setting data has been stored based upon the flags 0 and 1. It should also be noted that an expansion area in which valid security setting data has been stored will be simply referred to as "valid expansion area" hereinafter.

Each of the user data areas 0 and 1, and each of the expansion areas 0 and 1 is segmented in a plurality of sectors. In this case, a sector corresponds to a unit of erasing operation in a memory block. Erasing operations of memory cells which belong to the same sector are carried out at the same time. Generally speaking, each of those sectors is constructed of an array of memory cells formed in the same well.

More specifically, the user data area 0 is constituted of sectors 0 to m, whereas the user data area 1 is constructed of sectors m+1 to n. Also, the expansion area is constructed of expansion sectors 0 and 1, whereas the expansion area 1 is constructed of expansion sectors 2 and 3. The expansion sectors 0 and 2 correspond to sectors which are used to store therein write parameters, whereas the expansion sectors 1 and 3 correspond to sectors which are employed to store therein security setting data and the flags 0 and 1. It should also be understood that both the security setting data and the flags 0 and 1 have been saved in the expansion areas 0 and 1 which are different from the sectors for storing therein the write parameters. Both the security setting data and the flags 0 and 1 can be erased irrespective of the write parameter. As a consequence, both the security setting data and the flags 0 and 1 can be rewritten independent of the write parameter.

The memory controller 12 is equipped with flag registers 0 and 1, a valid flag selecting circuit 14, and a, valid area information register 15. The flag registers 0 and 1 receive the flags 0 and 1 from the expansion areas 0 and 1 so as to save therein the received flags 0 and 1. The valid flag selecting circuit 14 judges a valid expansion area from the flags 0 and 1 saved in the flag registers 0 and 1. The valid flag selecting circuit 14 is equipped with an exclusive OR (XOR) gate 16 and a valid area judging circuit 17. The XOR gate 16 performs XOR operation between the flags 0 and 1. The valid area judging circuit 17 judges a valid area based upon an output of the XOR gate 16. (namely, XOR value between flags 0 and 1).

Figures 5, 6:
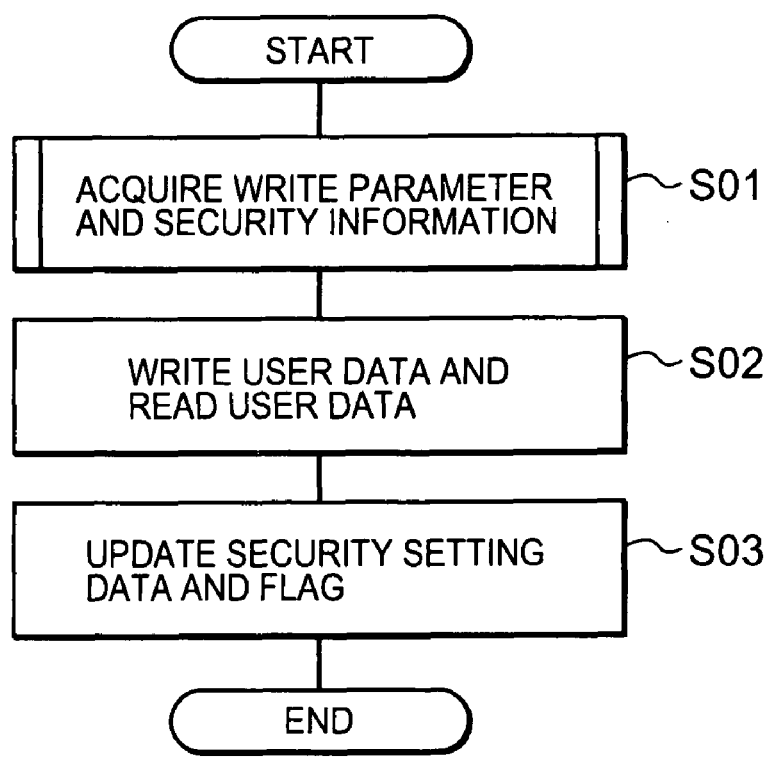
FIG. 5 is a table for indicating a corresponding relationship between values of flags and valid expansion areas.
FIG. 6 is a flow chart for describing operations of the semiconductor device according to the first embodiment the present invention.

One of features of the flash memory 11 according to this embodiment is in a method of setting flags 0 and 1, and another method of judging a valid expansion area based upon the flags 0 and 1. FIG. 5 is a table for representing a corresponding relationship between values of the flags 0 and 1 and the valid expansion areas. The flags 0 and 1 have been determined in such a manner that XOR values of those flags 0 and 1 are made coincident with area numbers of those valid expansion areas. Specifically, in a case where both the flags 0 and 1 are "0" or "1", the expansion area 0 is designated as the valid expansion area. It should be understood that an XOR value of the flags 0 and 1 is "0". On the other hand, in such a case where one of the flags 0 and 1 is "0" and another is "1", an expansion area 1 is designated as the valid expansion area. It should be understood that an XOR value between the flags 0 and 1 is "1". The above-mentioned XOR gate 16 plays a role of calculating an XOR value between the flags 0 and 1, namely, calculating a number of a valid expansion area.

A first merit of the corresponding relationship between the values of the flags 0 and 1 and the expansion areas, which is determined in the table of FIG. 5, is given as follows: even when the flags 0 and 1 are brought into any statuses, a single expansion area is determined as the valid expansion area. Even when the flag 0 is "1", this status does not always imply that the expansion area 0 corresponds to the valid expansion area. As previously described, in such a judging operation which judges that an expansion area corresponding to a case where a flag has a specific value (for instance, "1") is valid, when both the flags 0 and 1 become "1", a valid data area becomes indefinite, resulting in an undesirable condition.

A second merit of the above-mentioned corresponding relationship is given as follows: only one of those flags 0 and 1 is inverted, so that the valid expansion areas can be changed. For instance, a case will now be considered in which both the flags 0 and 1 are "0" under initial condition. Under the initial condition, the expansion area 0 is designated as the valid expansion area. In order to change the valid expansion area from the expansion area 0 to the expansion area 1, the value of the flag 1 may be merely inverted from "0" to "1". To put it more generally, in order to change a valid expansion area from an expansion area i to another expansion area j, a flag j may be merely inverted. In this case, symbols i and j imply such values that one symbol is "0", and another symbol is "1".

The semiconductor device 10 of this embodiment performs both a writing operation and a reading operation at the same time and in a simple operation sequence by utilizing the nature of the corresponding relationship shown in FIG. 5. FIG. 6 is a diagram for representing an example of an operation sequence for simultaneously performing a writing operation and a reading operation. A description is made of a case where the reading operation is carried out in the user data area 0 of the memory block 0, and the writing operation is carried out in the user data area 1 of the memory block 1. Under initial condition, it is so assumed that both of the flags 0 and 1 are equal to "0". In other words, the expansion area 0 is the valid expansion area in the initial status.

Figure 7:
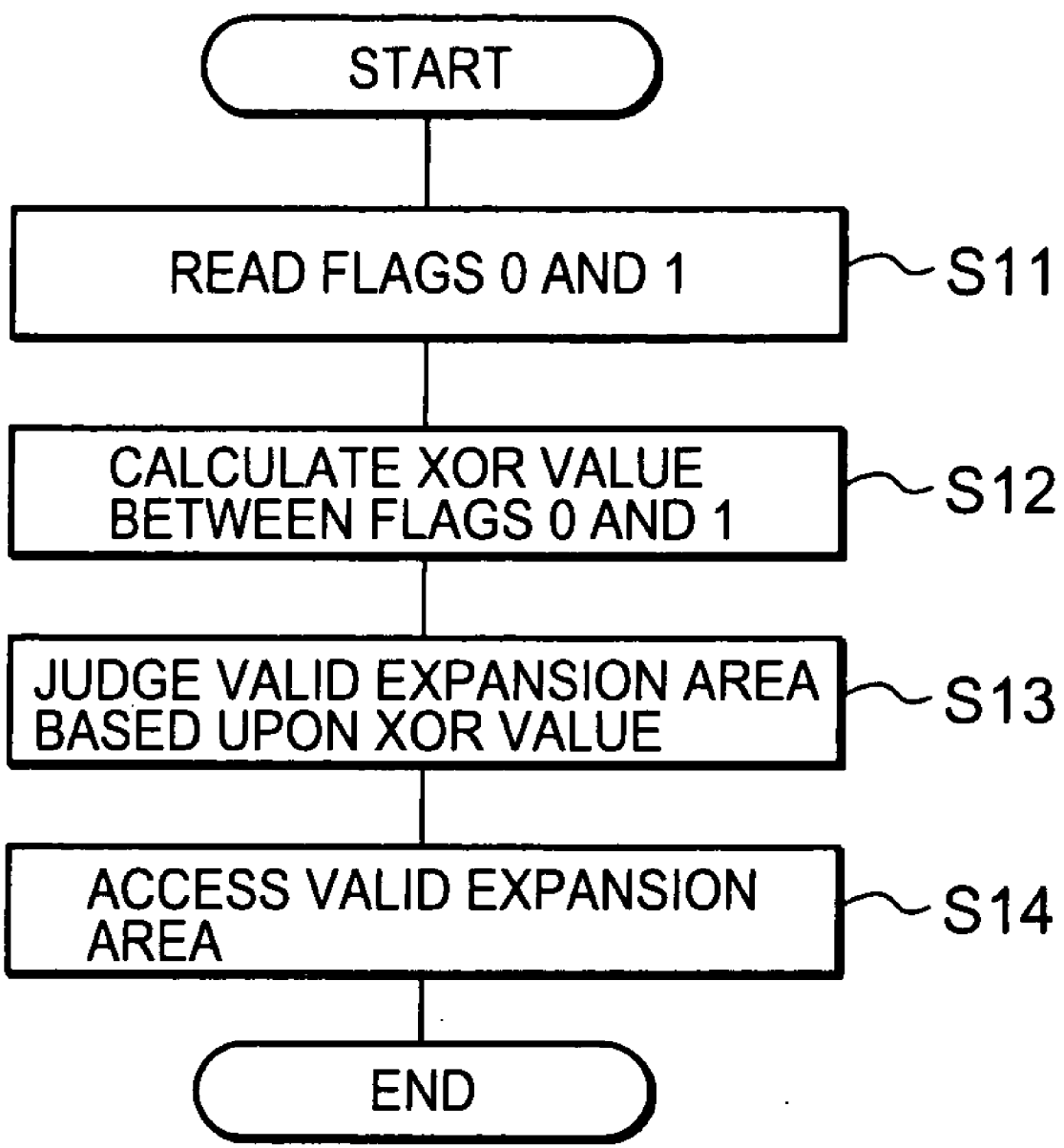
FIG. 7 is a flow chart for describing a sequential operation for reading a write parameter and security setting data.

Firstly, both a write parameter and security setting data are read (step S01). FIG. 7 is a flow chart for describing reading operations of the write parameter and the security setting data. The memory controller 12 firstly reads flags 0 and 1 from the expansion areas 0 and 1, respectively (step S11). Subsequently, the XOR gate 16 performs an XOR-gating calculation between the flags 0 and 1 (step S12). The valid area judging circuit 17 judges a valid expansion area based upon the XOR value between the flags 0 and 1 (step S13). The valid area judging circuit 17 judges that an expansion area to which a number coincident with the XOR value between the flags 0 and 1 is allocated is the valid expansion area. It should be understood that both the flags 0 and 1 are used so as to specify the valid expansion area. Since both the flags 0 and 1 are used, there is no event that the valid expansion area becomes indefinite even when the flags 0 and 1 are brought into any statuses. The valid area judging circuit 17 outputs valid area information to the CPU 13, while the valid area information indicates which of the expansion areas 0 and 1 is the valid expansion area.

Subsequently, the memory controller 12 accesses the valid expansion area so as to read both a write parameter and security setting data (step S14). The read write parameter and the read security setting data are stored in a temporary memory (not shown) prepared in the memory controller 12.

Figure 8:
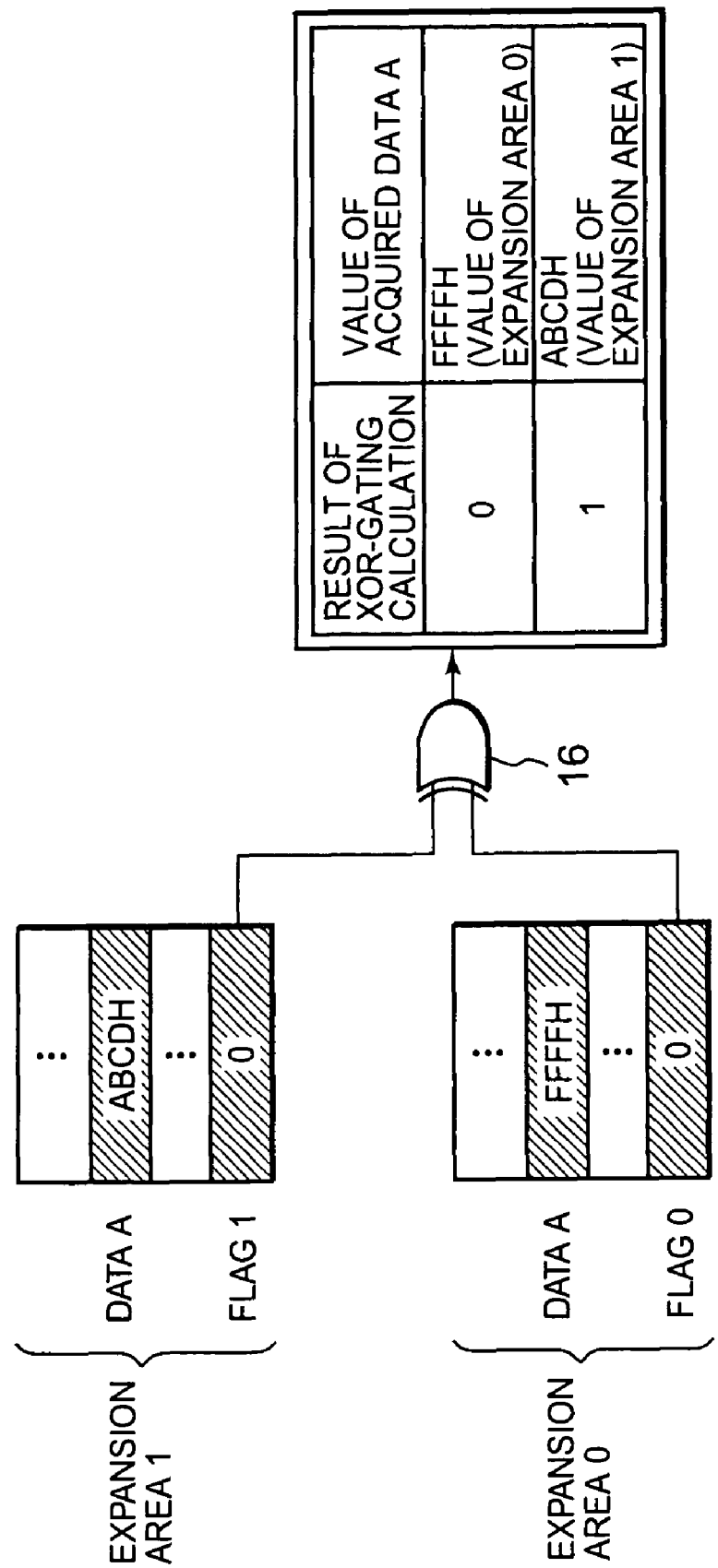
FIG. 8 is a diagram for representing an example of operations for reading the write parameter and the security setting data.

FIG. 8 is a diagram for showing the reading operation of the write parameter and the security setting data from the expansion areas 0 and 1 in a more concrete manner. In the case where both of the flags 0 and 1 are "0", an XOR value between the flags 0 and 1 becomes "0". As a consequence, it is so judged that the valid expansion area is the expansion area 0, so the write parameter and the security setting data are read from the expansion area 0. A table of FIG. 8 represents a value of data "A" of the write parameter. In the case where an XOR value between the flags 0 and 1 is "0", a value of "FFFFH" is read which is stored in the expansion area 0 as the data A.

Subsequently, the memory controller 12 judges whether or not a writing operation for a designated write address is permitted and whether or not a reading operation from a designated read address is permitted based upon the security setting data. When no permission is made, the writing operation and/or the reading operation are not carried out.

As shown in FIG. 6, user data is written and read subsequent to the reading operations of both the write parameter and the security setting data (step S02). More specifically, the memory block 0 is set to the read mode, and the memory block 1 is set to the write mode. Thereafter, as represented in FIG. 4, the user data is written in the user data area 1 of the memory block 1, and the user data is read from the user data area 0 of the memory block 0. When the user data is written to the user data area 1, the write parameter read in the above-mentioned step S01 is used.

Subsequently, both security setting data and a flag are updated (step S03). More specifically, in the step S03, security setting data is updated which has been stored in the expansion area of the memory block equal to the user data area where the user data has been written. In addition, a flag is updated in order that the expansion area where the security setting data has been updated is set to the valid expansion area. In this embodiment, the security setting data of the expansion area 1 of the memory block 1, in which the writing operation is carried out, is updated. Further, the flag is updated in order that the valid expansion area is changed from the expansion area 0 to the expansion area 1.

As one feature of the flash memory 11, only a flag of an updated expansion area (namely, expansion area of memory block where writing operation has been carried out) is updated. In this embodiment, only the flag 1 of the expansion area 1 of the memory block 1 where the writing operation has been carried out is updated, and the flag 0 of the expansion area 0 is maintained under present status. Since the memory block 1 has already been set to the write mode in the previous step S02, there is no need to change the operation mode in order that the flag 1 of the expansion area 1 of the memory block 1 is updated. Also, the operation mode of the memory block 0 need not be changed from the read mode to the write mode. As a consequence, the flags can be rewritten in a simple operation sequence.

Figure 9:
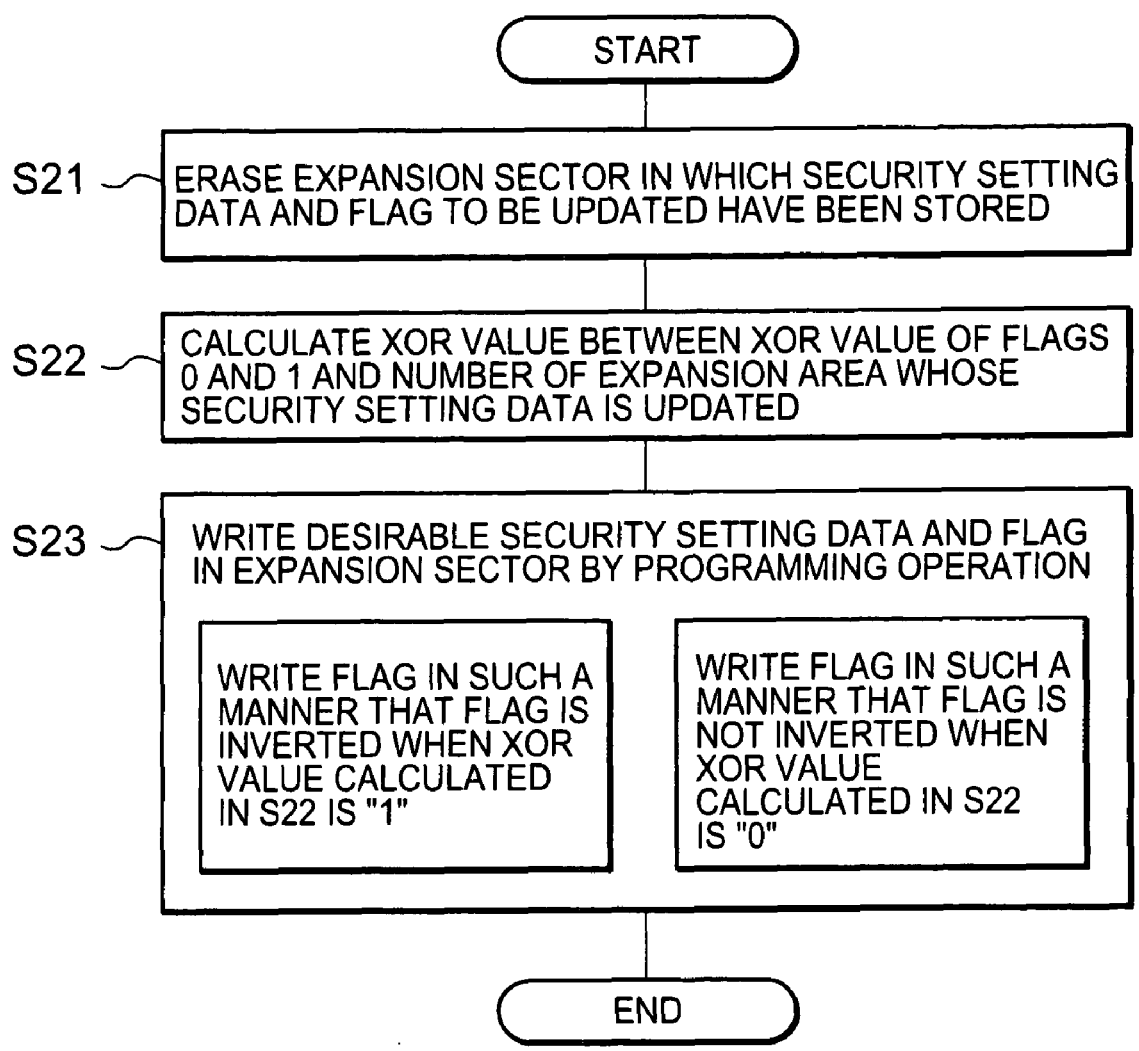
FIG. 9 is a flow chart for indicating a sequence of a flag updating operation.

FIG. 9 is a flowchart for describing sequences for updating security setting data and flags. Firstly, an erasing operation is performed with respect to an expansion sector where both security setting data and a flag to be updated have been stored (step S21). Precisely, the erasing operation is performed for this expansion sector in which security setting data and a flag in an expansion area of the same memory block as a user data area where user data has been written have been stored. In this embodiment, the erasing operation is carried out with respect to an expansion sector 3 of the expansion area 1.

Subsequently, an XOR-gating calculation is carried out between the XOR value of the flags 0 and 1, and a number of the expansion area whose security setting data is updated (step S22). As previously described, since the XOR value of the flags 0 and 1 indicates the number of an expansion area which was valid immediately before the present XOR-gating calculation (namely, was valid before updating operation), the operation of the step S22 is equivalent to an operation that an XOR value is calculated between the number of expansion area which was valid just before the present XOR-gating calculation and the number of expansion area to be updated.

Subsequently, a programming operation is carried out with respect to the expansion sector where the data was erased in the step S21, so that desirable security setting data and a desirable flag are written in this expansion sector (step S23). The flag writing operation is carried out in such a manner that the expansion area whose security setting data was updated is subsequently designated as the valid expansion area.

A value of the flag after being written is determined in accordance with a value of the flag before being updated, and the XOR value calculated in the step S22. Specifically, in the case where the XOR value calculated in the step S22 is "1", the flag is written in such a manner that the value of the flag after being written is inverted from the value of the flag before being updated. On the other hand, in the case where the XOR value calculated in the step S22 is "0", the flag is written in such a manner that the value of the flag after being written is made coincident with the value of the flag before being updated. Since the erasing operation is carried out in the step S21, even when the value of the flag after being written is made coincident with the value of the flag before being updated, there are some cases that a flag must be written by performing a programming operation.

Figure 10:
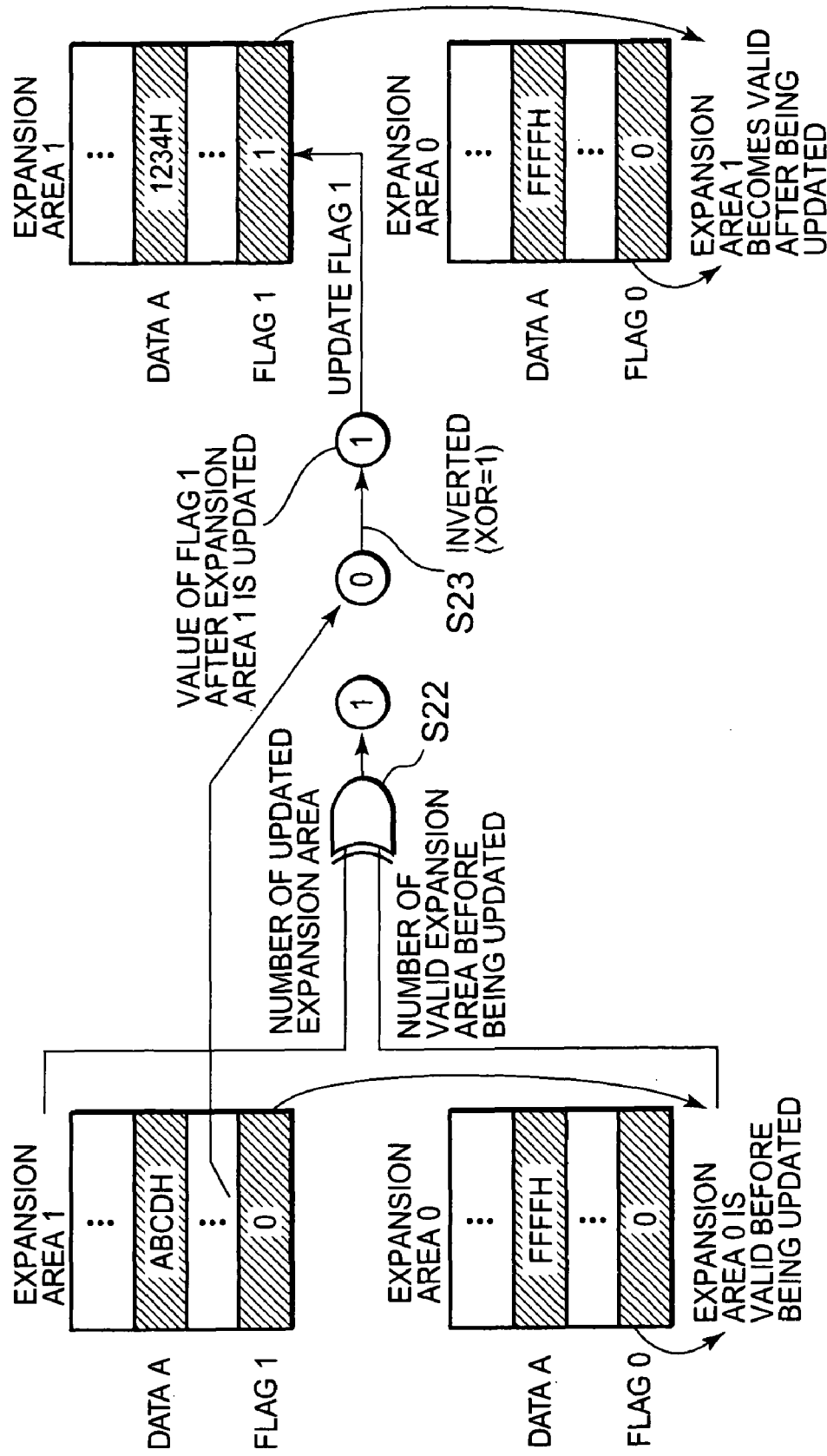
FIG. 10 is a diagram for showing an example of the flag updating operation.

FIG. 10 is a diagram for indicating updating operations of the flags in a more concrete manner. That is, FIG. 10 represents operations of the semiconductor device 10 in the case where any of the flags 0 and 1 before being updated is equal to "0", and the security setting data of the expansion area 1 is updated. First, an erasing operation is carried out with respect to the expansion sector 3 of the expansion area 1. It should also be noted that the expansion sector 3 corresponds to a sector in which both the security setting data and the flag are stored within the expansion area 1. Since this erasing operation is carried out, all of the security setting data and the flag of the expansion sector 3 are set to "0".

Subsequently, a programming operation is carried out, so that desirable security setting data and a desirable flag are written in the expansion sector 3. The values of the flags are determined based upon the below-mentioned manner. Since both of the flags 0 and 1 are "0" before being updated, the XOR value between the flags 0 and 1 before being updated is "0", namely, the number of the expansion area which was valid just before the present XOR-gating calculation is equal to "0". Further, the number of the expansion area which has been updated is equal to "1". As a result, the value of the XOR-gating calculation in the step S22 is "1". In the programming operation, "1" is written as the flag 1 in response to a fact that the XOR value calculated in the step S22 is "1". As a result, the value of the flag 1 is inverted from "0" to "1". On the other hand, the value of the flag 0 is still maintained. As a consequence, the valid expansion area is changed from the expansion area 0 to the expansion area 1.

Figure 11:
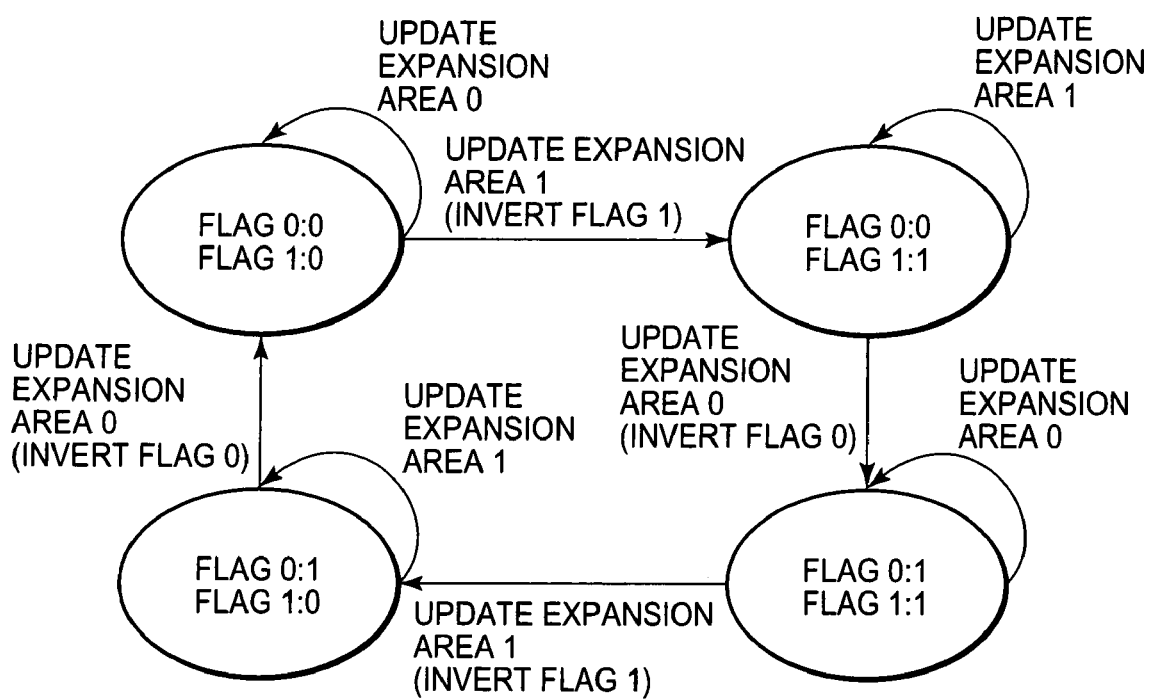
FIG. 11 is a status transition diagram of the flags.

Such a fact that the flags 0 and 1 can be correctly updated based upon the operations shown in FIG. 9 from any statuses of those flags 0 and 1 may be readily understood from a status transition diagram of FIG. 11. For instance, in the case where both of those flags 0 and 1 are "0" and the expansion area 0 is updated, the XOR value calculated in the step S21 becomes "0". As a consequence, the flag 0 of the expansion area 0 is not updated, but the valid expansion area is correctly maintained as the expansion area 0. Further, in such a case where the flag 0 is "0", the flag 1 is "1", and accordingly, the expansion area 1 has been designated as the valid expansion area, when the expansion area 0 is updated, the XOR value calculated in the step S21 is "1". As a consequence, the flag 0 is inverted from 0 to 1, so the valid expansion area is changed from the expansion area 1 to the expansion area 0.

As previously described, in this embodiment, the flags 0 and 1 are determined in such a manner that the XOR value of those flags 0 and 1 is made coincident with the number of the valid expansion area. As a result, even when the flags 0 and 1 are brought into any statuses, the single expansion area is determined as the valid expansion area while the valid expansion area does not become indefinite. In addition, when the specific expansion area is updated, only the flag of the specific expansion area is inverted, so the specific expansion area can be set to the valid expansion area. This eliminates a necessity to set the memory blocks other than the memory blocks containing the specific expansion area to the write mode, and also, effectively simplifies the writing operation.

It should also be noted that the above-mentioned operations can be realized by adding only 1-bit flag to the respective expansion areas 0 and 1. Such an operation for merely adding the 1-bit flag to each of the expansion areas becomes advantage in reducing the sizes of the expansion areas, and also, becomes advantage in decreasing the hardware required for judging the valid expansion area from the flag.

Although the invention has been described above in connection with a preferred embodiment thereof, it will be appreciated by those skilled in the art that the embodiment is provided solely for illustrating the invention, and should not be relied upon to construe the appended claims in a limiting sense. It should also be understood that in this embodiment, the present invention is employed in order to designate the valid expansion area from the expansion areas 0 and 1. Alternatively, the technique disclosed in this embodiment may generally be employed in order to judge which of a plurality of areas is valid.

What is claimed is:

1. A data processing apparatus for performing write and read operations simultaneously, comprising: a memory that includes and second memory blocks, the first memory block having a first user data area, a first setting data area storing a first flag data, and the second memory block having a second user data area, a second setting data area storing a second flag data,
respectively; and a memory controller that compares between the first and second flag data to determine one of the first and second memory blocks for a write operation, wherein in a first state, the memory controller performs the write operation to write a first data to the second user data area and updates the second flag data to a first value, wherein in a second state following the first state, the memory controller performs the write operation to write a second data to the first user data area and updates the first flag data to the first value, wherein in a third state following the second state, the memory controller performs the write operation to write a third data to the second user data area based on a result of the comparing between the first and second flag data, and updates the second flag data to a second value, wherein in a fourth state following the third state, the memory controller performs the write operation to write a fourth data to the first user data area based on a result of the comparing between the first and second flag data, and updates the first flag data to the second value, and wherein in a fifth state following the fourth state, the memory controller performs the write operation to write a fifth data to the second user data area based on a result of the comparing between the first and second flag data, and updates the second flag data to the first value.

2. The data processing apparatus according to claim 1, wherein the memory controller that compares between the first and second flag data to determine one of the first and second memory blocks as a valid memory block, wherein the memory controller determines the first memory block as the valid memory block and performs a read operation for the first memory block and a write operation for the second memory block, when the first flag data is in agreement with the second flag data, and wherein the memory controller determines the second memory block as the valid memory block and performs the read operation for the second memory block and the write operation for the first memory block, when the first flag data is different from the second flag data.

3. The data processing apparatus according to claim 2, wherein a first security setting data and a first write parameter belong to the first setting data area, and a second security setting data and second write parameter belong to the second setting data area, and wherein the memory controller controls the write operation based on a write parameter of the setting data area corresponding to the valid memory block, and the read operation based on a security setting data of the setting data area corresponding to the valid memory block.

4. The data processing apparatus according to claim 3, wherein the first security setting data is stored in a first sector in which the first flag data is stored, and the second security setting data is stored in a second sector in which the second flag data are stored.

5. The data processing apparatus according to claim 1, wherein the memory controller performs the write operation for one of the first and second memory blocks and the read operation for other of the first and second memory blocks, simultaneously, and wherein the memory controller updates one of the first and second flag data corresponding to the memory block for which the write operation is performed and remains other of the first and second flag data.

6. The data processing apparatus according to claim 1, wherein the memory controller performs the write operation for one of the first and second memory blocks and the read operation for other of the first and second memory blocks based on a XOR value between the first flag data and the second flag data.

* * * * *